US008321076B2

(12) United States Patent
Sharma et al.

(10) Patent No.: US 8,321,076 B2
(45) Date of Patent: Nov. 27, 2012

(54) ON-LINE INERTIA ESTIMATION FOR USE IN CONTROLLING AN AEROSPACE VEHICLE

(75) Inventors: Manu Sharma, Signal Hill, CA (US); Qinghong W. Wang, Torrance, CA (US)

(73) Assignee: The Boeing Company, Chicago, IL (US)

( * ) Notice: Subject to any disclaimer, the term of this patent is extended or adjusted under 35 U.S.C. 154(b) by 93 days.

(21) Appl. No.: 12/641,718

(22) Filed: Dec. 18, 2009

(65) Prior Publication Data
US 2011/0153122 A1 Jun. 23, 2011

(51) Int. Cl.
*B64G 1/28* (2006.01)
*B64G 1/36* (2006.01)
*B64G 1/38* (2006.01)

(52) U.S. Cl. .......... 701/13; 244/165; 244/170; 244/171; 702/1; 702/153

(58) Field of Classification Search .................. 701/3, 4, 701/13; 244/164, 171; 706/905
See application file for complete search history.

(56) References Cited

U.S. PATENT DOCUMENTS

| | | | | |
|---|---|---|---|---|
| 5,452,869 | A * | 9/1995 | Basuthakur et al. | 244/164 |
| 5,749,545 | A * | 5/1998 | Gnatjuk | 244/164 |
| 5,984,238 | A * | 11/1999 | Surauer et al. | 244/171 |
| 6,000,661 | A * | 12/1999 | Price et al. | 244/164 |
| 6,062,512 | A * | 5/2000 | Wang et al. | 244/170 |
| 6,260,805 | B1 * | 7/2001 | Yocum et al. | 244/164 |
| 6,263,264 | B1 | 7/2001 | Herman et al. | |
| 6,285,928 | B1 * | 9/2001 | Tilley et al. | 701/13 |
| 6,317,662 | B1 * | 11/2001 | Li et al. | 701/13 |
| 6,341,249 | B1 * | 1/2002 | Xing et al. | 701/13 |
| 6,471,161 | B1 * | 10/2002 | D'Ambrosio et al. | 244/164 |
| 7,076,341 | B2 * | 7/2006 | Holt et al. | 701/13 |
| 7,076,342 | B2 * | 7/2006 | Fukuda et al. | 701/4 |
| 7,110,915 | B2 * | 9/2006 | Wilson | 702/181 |
| 7,149,610 | B2 * | 12/2006 | Wang et al. | 701/13 |
| 7,248,948 | B2 * | 7/2007 | Shiho et al. | 701/4 |
| 2002/0148930 | A1 | 10/2002 | Yamashita | |

(Continued)

FOREIGN PATENT DOCUMENTS
EP 2 279 947 A1 2/2011
(Continued)

OTHER PUBLICATIONS

Shuting et al., On-Line Mass-Property Identification Algorithm Research for Satellite, 2006, Chinese Control Conference 2006 (CCC '06), pp. 519-524 [Chinese].*

(Continued)

*Primary Examiner* — Thomas Black
*Assistant Examiner* — Lindsay M Browder
(74) *Attorney, Agent, or Firm* — Charles L. Moore; Moore & Van Allen PLLC

(57) ABSTRACT

A system for controlling an aerospace vehicle using on-line inertia estimation may include an attitude sensor to measure an attitude of the aerospace vehicle. The system may also include a processor on board the aerospace vehicle. An inertia estimator operable on the processor may generate an on-line inertia estimate of the aerospace vehicle. A rate and attitude estimator operable on the processor may determine an angular position and angular velocity of the aerospace vehicle using the attitude measurement of the aerospace vehicle and the on-line inertia estimate for controlling movement and orientation of the aerospace vehicle without any rates of rotation of the aerospace vehicle being required.

18 Claims, 2 Drawing Sheets

U.S. PATENT DOCUMENTS

2003/0216864 A1* 11/2003 Fukuda et al. ............... 701/216
2010/0019092 A1   1/2010 Liu et al.
2011/0024571 A1*  2/2011 Tsao et al. ................... 244/171

FOREIGN PATENT DOCUMENTS

JP         2000296800   * 10/2000

OTHER PUBLICATIONS

Wilson et al., On-Line Gyro-Based Mass-Property Identification for Thruster-Controlled Spacecraft Using Recursive Least Squares, 2002, The 2002 45th Midwest Symposium on Circuits and Systems (MWSCAS-2002), vol. 2, pp. 334-337.*

Keim et al., Spacecraft Inertia Estimation Via Constrained Least Squares, 2006, 2006 IEEE Aerospace Conference, pp. 1-6.*

Wertz et al—In-Flight Estimation of the Cassini Spacecraft's Inertia Tensor, 2000, Cassini Attitude Control Team, California Institute of Technology Jet Propulsion Laboratory (JPL), pp. 1-14.*

Psiaki et al., Attitude Estimation for a Flexible Spacecraft in an Unstable Spin, 2002, Journal of Guidance Control and Dynamics, vol. 25, No. 1, pp. 88-95.*

Tsiotras et al., Satellite Attitude Control and Power Tracking with Energy/Momentum Wheels, 2001, Journal of Guidance, Control and Dynamics, vol. 24, No. 1, pp. 23-34.*

Thienel, J.K. "Estimation of Spacecraft Inertia Parameters." AIAA Guidance, Navigation and Control Conference and Exhibit, Aug. 18-21, 2008, Honolulu, Hawaii.

European Patent Office, European Search Report for European Patent Application No. 10193373.7-2422 dated Mar. 18, 2011.

* cited by examiner

ON-LINE INERTIA ESTIMATION FOR USE IN CONTROLLING AN AEROSPACE VEHICLE

FIELD

The present disclosure relates to aerospace vehicles and controlling the attitude of an aerospace vehicle, and more particularly to on-line inertia estimation for use in controlling an attitude of an aerospace vehicle.

BACKGROUND

Aerospace vehicles, such as spacecraft, including satellites and other space vehicles, orbit the earth performing a multitude of different functions and operations, such as links in telecommunications systems, photographing selected geographical areas, sensing or measuring different conditions on the earth, and monitoring weather patterns and conditions, to name a few. The attitude of these spacecraft or orientation relative to some reference, such as the earth, sun, etc., is critical to the proper performance of these spacecraft. The stability and accuracy of a satellite rotating about a given axis is a concern in many known aerospace applications. For example, some known spacecraft, such as geosynchronous communication satellites, spin about a geometric axis during transfer orbit. The performance of spin axis control directly impacts procedures such as attitude determination, thermal control, propellant management, fuel-efficient velocity increment maneuvers, command and telemetry linkage and solar power collection. While operating a spacecraft with attitude only measurements (e.g. from a star tracker) during transfer orbit, the ability of a closed-loop control system on board the spacecraft to regulate the cone angle is limited by a priori knowledge of the spacecraft's moments of inertia. The system relies upon ground-based off-line inertia estimates computed based on painstaking and time consuming modeling. These ground-based estimates of inertia, especially products of inertia, typically have errors that can result as cone angle errors. Such errors can also adversely effect orientation or pointing accuracy of the satellite, apogee thruster inefficiency, increased operation of reaction wheels or other momentum conserving actuators resulting in increased power usage and thermal loads as well as other adverse effects.

BRIEF SUMMARY

In accordance with an embodiment, a system for controlling an aerospace vehicle using on-line inertia estimation may include a processor on board the aerospace vehicle. An inertia estimator operable on the processor may generate an on-line estimate of the aerospace vehicle inertia. A rate and attitude estimator operable on the processor may determine an angular position and angular velocity of the aerospace vehicle using an attitude measurement and the on-line inertia estimate for controlling movement and orientation of the aerospace vehicle without measurement of any rates of rotation of the aerospace vehicle being required.

In accordance with another embodiment, an aerospace vehicle may include a plurality of actuators for controlling an attitude of the aerospace vehicle. The aerospace vehicle may also include a system for controlling the plurality of actuators using on-line inertia estimation. The system for controlling the plurality of actuators using on-line inertia estimation may include a processor on board the aerospace vehicle. An inertia estimator operable on the processor may generate an on-line inertia estimate of the aerospace vehicle. A rate and attitude estimator operable on the processor may determine an angular position (or attitude) and angular velocity (or angular rates of rotational motion) of the aerospace vehicle using the attitude measurement and the on-line inertia estimate for controlling movement and orientation of the aerospace vehicle.

In accordance with another embodiment, a method for controlling an aerospace vehicle using on-line inertia estimation may include measuring an attitude of the aerospace vehicle. The method may additionally include determining an on-line inertia estimate of the aerospace vehicle. The method may also include determine an angular position and angular velocity of the aerospace vehicle using the attitude measurement and on-line inertia estimate. The method may further include controlling movement and orientation of the aerospace vehicle based on the estimated angular position and angular velocity of the aerospace vehicle.

In accordance with another embodiment, a computer program product for controlling an aerospace vehicle using on-line inertia estimation may include a computer readable storage medium having computer readable program code embodied therewith. The computer readable program code may include computer readable program code configured to determine an on-line inertia estimate of the aerospace vehicle. The computer readable program code may also include computer readable program code configured to determine an angular position and angular velocity of the aerospace vehicle using an attitude measurement and the on-line inertia estimate. The computer readable program code may additionally include computer readable program code configured to control movement and orientation of the aerospace vehicle based on the estimated angular position and angular velocity of the aerospace vehicle.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1:
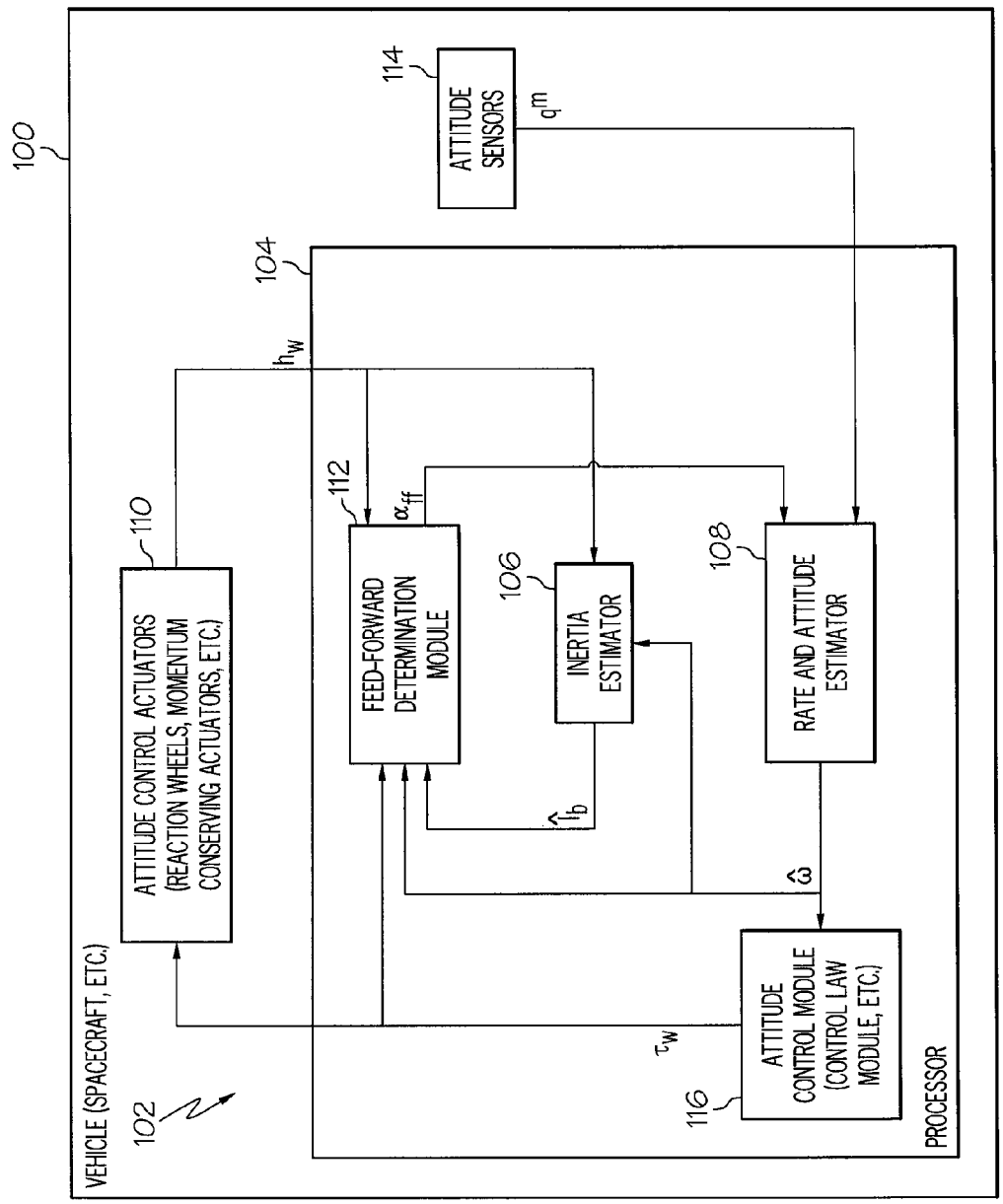
FIG. 1 is a block schematic diagram of an exemplary aerospace vehicle including a system for on-line inertia estimation for use in controlling the aerospace vehicle in accordance with an embodiment of the present disclosure.

The following detailed description of embodiments refers to the accompanying drawings, which illustrate specific embodiments of the disclosure. Other embodiments having different structures and operations do not depart from the scope of the present disclosure.

As will be appreciated by one of skill in the art, features of the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in base band or as part of a carrier wave. Such a propagated signal may take any of a variety of forms, including, but not limited to, electro-magnetic, optical, or any suitable combination thereof. A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block schematic diagram of an exemplary aerospace vehicle 100 including a system 102 for controlling the aerospace vehicle 100 using on-line inertia estimation in accordance with an embodiment of the present disclosure. The system 102 may include a processor 104 on board the aerospace vehicle 100. The system 102 may also include an inertia estimator 106 operable on the processor 104. The inertia estimator 106 may generate an on-line inertia estimate of the aerospace vehicle 100 using an estimated angular velocity ($\hat{\omega}$) of the aerospace vehicle 100 and measured or estimated momentum ($h_W$) of the attitude control actuators 110. The system 102 may additionally include a rate and attitude estimator 108. The rate and attitude estimator 108 may be operable on the processor 104 to determine an angular position and angular velocity or rates of the aerospace vehicle 100 using an attitude measurement ($q^m$) and the on-line inertia estimate generated by the inertia estimator 106 for controlling movement and orientation of the aerospace vehicle 100 without measurement of the rates of rotation of the aerospace vehicle being required. Accordingly no rate sensors are required by the system 102.

The inertia estimator 106 may be adapted to generate the on-line inertia estimate without requiring information from an angular rate sensor. The inertia estimator 106 may also operate in parallel with the rate and attitude estimator 108. The on-line inertia estimate from the inertia estimator 106 provides improved accuracy of the angular position and angular velocity estimate of the aerospace vehicle 100 to permit reduced aerospace vehicle power use and thermal loading for active nutation control of a spinning aerospace vehicle.

As described in more detail herein, the inertia estimator 106 may generate the on-line inertia estimate by generating an on-line estimate of an inertia matrix ($\hat{I}_b$) about a center of mass of the aerospace vehicle 100 using an estimated angular velocity ($\hat{\omega}$) of the aerospace vehicle 100 and a measured or estimated momentum ($h_W$) of an attitude control actuator 110. The inertia estimator 106 may generate the inertia estimate by defining a gyroscopic moment term derived from the estimated angular velocity and the estimated momentum of the aerospace vehicle 100. The gyroscopic moment term may be driven to zero to obtain convergence of the angular velocity of the vehicle 100. The gyroscopic moment term may be driven to zero by defining a cost function incorporating the gyroscopic moment term and then optimizing the cost function. The cost function is driven to zero to cause an angular velocity estimate of the aerospace vehicle 100 to converge to a true angular velocity of the aerospace vehicle.

A feed-forward determination module 112 or calculation module may receive the inertia estimate or estimated inertia matrix ($\hat{I}_b$) from the inertia estimator 106. The feed-forward determination module may determine or compute an estimated angular acceleration ($\alpha_{ff}$) in response to a control torque command signal ($\tau_w$) and coupling between the angular velocity ($\omega$) and the momentum (h) of the aerospace vehicle 100. The coupling between the angular velocity ($\omega$) and the momentum (h) may be determined or computed based on the estimated inertia ($\hat{I}_b$) from inertia estimator 106, the estimated angular velocity ($\hat{\omega}$), and measured or estimated wheel momentum ($h_W$) or momentum of attitude control actuators 110.

The rate and attitude estimator 108 may determine the angular position and angular velocity ($\hat{\omega}$) of the aerospace vehicle 100 by propagating the equations of motion based on estimated angular accelerations ($\alpha_{ff}$) from the feed-forward determination module 112. When attitude measurement data is available, the difference between the measured and estimated attitude may be used to update angular position and angular velocity estimates. The aerospace vehicle 100 may include attitude sensors 114 that may sense an attitude of the aerospace vehicle 100 and other information related to orientation or movement of the aerospace vehicle 100. The attitude measurement data ($q^m$) may be provided by the attitude sensor 114 or sensors to the rate and attitude estimator 108.

The aerospace vehicle 100 may also include an attitude control module 116. The attitude control module may receive the estimated angular rate or angular velocity ($\hat{\omega}$) from the rate and attitude estimator 108. The attitude control module 116 may include a spin stabilizing control law for active nutation control of the aerospace vehicle using attitude control actuators 110 which may include reaction wheels or other momentum conserving actuators. The attitude control module 116 may determine or compute the control torque command signal ($\tau_w$) for controlling operation of the attitude control actuators 110 and for use by the feed-forward determination module 112 in determining the estimated angular acceleration ($\alpha_{ff}$) for the attitude and rate estimator 108.

As previously discussed, the inertia estimator 106 generates an on-line or real-time inertia estimate that is autonomously and automatically generated as described herein and does not need a priori knowledge or information from an angular rate sensor, such as a gyroscope or similar device. Euler's equations for rotation of a rigid spacecraft or aerospace vehicle with reaction wheels (or momentum wheel, control momentum gyros, etc.) may be written as equation 1:

$$I_b \dot{\omega} + u + \omega^x (I_b \omega + h_w) = 0 \qquad \text{Eq. 1}$$

where $$\omega = \begin{bmatrix} \omega_1 \\ \omega_2 \\ \omega_3 \end{bmatrix}$$

is the angular velocity (or rates) of the aerospace vehicle 100 represented in the vehicle coordinate system, $h_w$, is the composite wheel momentum represented in the vehicle coordinate system, and $$I_b = \begin{bmatrix} I_{11} & I_{12} & I_{13} \\ I_{12} & I_{22} & I_{23} \\ I_{13} & I_{23} & I_{33} \end{bmatrix}$$

is the composite inertia matrix of the vehicle about the center of mass. $\dot{x}$ represents the time derivative of variable x. $u=\dot{h}_w$ is the control torque, $\omega^x$ is a skew-symmetric matrix based on three elements of $\omega$, defined as $$\omega = \begin{bmatrix} 0 & -\omega_3 & \omega_2 \\ \omega_3 & 0 & -\omega_1 \\ -\omega_2 & \omega_1 & 0 \end{bmatrix}$$

$\omega^x$ is the matrix form of a vector cross product, i.e., $$\omega \times (I_b \omega + h_w) = \omega^x (I_b \omega + h_w) \qquad \text{Eq. 2}$$

Letting $\hat{\omega}$ be the estimated angular velocity, $\hat{I}_b$ be the estimated inertia matrix of the aerospace vehicle, $\hat{\omega}$ may be propagated based on Eq. 1 by substituting $\omega$ and $I_b$ by $\hat{\omega}$ and $\hat{I}_b$, respectively. Assuming u is a stabilizing control law for spinning about a given axis, generated based on the estimated angular velocity. At steady-state, both the angular velocity $\omega$ and the estimated angular velocity $\hat{\omega}$ will converge to a constant. At steady-state, Equation 1 reduces to Equation 2A, which is the condition with no transverse torques:

$$\omega^x (I_b \omega + h_w) = 0 \qquad \text{Eq. 2A}$$

However, $\hat{\omega}^x(\hat{I}_b \hat{\omega} + h_w)$ may not be zero if the estimated inertia matrix is not equal to the true inertia matrix. Inaccuracy of $\hat{\omega}^x(\hat{I}_b \hat{\omega} + h_w)$ can lead to errors in attitude and rate estimate. In order to break this, $\hat{\omega}^x(\hat{I}_b \hat{\omega} + h_w)$ is driven to zero. This can be achieved by updating $\hat{I}_b$ on-line. The following notation is defined:

$$v = \begin{bmatrix} I_{11} & I_{22} & I_{33} & I_{12} & I_{13} & I_{23} \end{bmatrix}^T \qquad \text{Eq. 3}$$

$$\Omega = \begin{bmatrix} \omega_1 & 0 & 0 & \omega_2 & \omega_3 & 0 \\ 0 & \omega_2 & 0 & \omega_1 & 0 & \omega_3 \\ 0 & 0 & \omega_3 & 0 & \omega_1 & \omega_2 \end{bmatrix} \qquad \text{Eq. 4}$$

The body momentum vector can be written as $I_b \omega = \Omega v$. Additionally, $\hat{v}$ and $\hat{\Omega}$ may represent estimates for v and $\Omega$, respectively. A gyroscopic moment term may now be defined as equation 5:

$$G(\hat{v}) = \hat{\omega}^x (\hat{\Omega}\hat{v} + h_w) \qquad \text{Eq. 5}$$

The gyroscopic moment term may be driven to zero in order to obtain convergence of the angular velocity and attitude estimates for the vehicle 100. Driving the gyroscopic moment term to zero may be achieved by optimizing $\hat{v}$ for a cost function. A cost function $J(\hat{v})$ may be defined as in Equation 6:

$$J(\hat{v}) = \frac{1}{2}G^T(\hat{v})G(\hat{v}) \qquad \text{Eq. 6}$$

Then the cost function can be minimized by updating $\hat{v}$ along the gradient of $J(\hat{v})$ with respect to $\hat{v}$, i.e.

$$\dot{\hat{v}} = -\Gamma \nabla J_{\hat{v}}^T = -\Gamma(\hat{\omega}^x \hat{\Omega})^T \hat{\omega}^x (\hat{\Omega}\hat{v} + h_w) \qquad \text{Eq. 7}$$

Where $\Gamma$ is a positive definite or a positive semi-definite gain matrix for the inertia estimator 106.

Since $J(\hat{v}) \geq 0$ at $t=0$, and $J(\hat{v})$ is decreasing by virtue of Equation 7, then $J(\hat{v}) \to 0$ as $t \to \infty$, which implies that $G(\hat{v}) = \hat{\omega}^x(\hat{\Omega}\hat{v} + h_w) \to 0$. In addition, the convergence in estimated angular velocity in Equation 6 implies that the equilibrium condition is for $$\omega_0^x(\Omega_0 \hat{v} + h_{w0}) = 0 \qquad \text{Eq. 8}$$

In the case of z-spin, $\omega_0 = [0\ 0\ \omega_s]^T$ the equilibrium conditions for Equation 1 implies that $h_{w1}^0 = -I_{13}\omega_s$, and $h_{w2}^0 = -I_{23}\omega_s$. Substituting these expressions for equilibrium angular velocity and wheel momentum in Equation 8 finally yields $\hat{I}_{13} \to I_{13}$ and $\hat{I}_{23} \to I_{23}$. Accordingly, a conclusion may be made that the inertia estimator 106 will converge to the correct value for the products of inertia $I_{13}$ and $I_{23}$.

Figure 2:
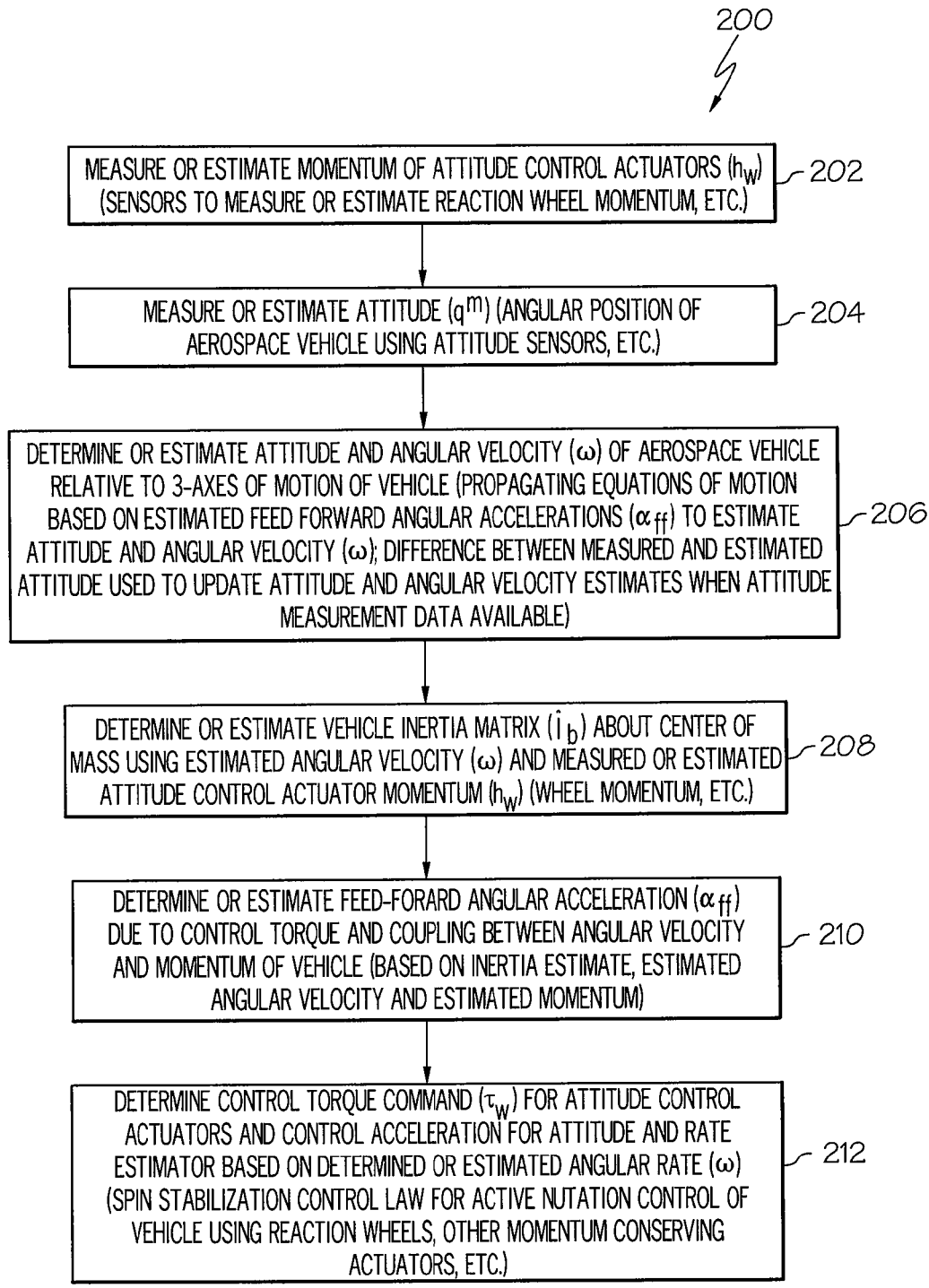
FIG. 2 is a flow chart of an example of a method for on-line inertia estimation for use in controlling the aerospace vehicle in accordance with an embodiment of the present disclosure.

FIG. 2 is a flow chart of an example of a method 200 for controlling an aerospace vehicle using on-line inertia estimation in accordance with an embodiment of the present disclosure. The method 200 may be embodied in the system 102 or may be performed by the system 102 of FIG. 1.

In block 202, momentum of an attitude control actuator or actuators may be measured or estimated. Similar to that previously described the attitude control actuator or actuators may include a reaction wheel or other momentum conserving actuator.

In block 204, attitude information or data may be measured or estimated. For example the angular position of the aerospace vehicle may be determined using attitude sensors.

In block 206, attitude and angular velocity of the aerospace vehicle or spacecraft may be determined or estimated relative to S-axes of motion of the vehicle. As previously discussed, propagating equations of motion based on estimated angular accelerations may be used to estimate the attitude and angular velocity of the vehicle. A difference between the measured and estimated attitude may be used to update the attitude and angular velocity estimates when the attitude measurement data is available.

In block 208, a vehicle inertia matrix may be determined or estimated about a center of mass using the estimated angular velocity and measure or estimated momentum of the attitude control actuator.

In block 210, a feed-forward angular acceleration due to control torque and coupling between angular velocity and momentum of the vehicle may be determined or estimated using estimated angular velocity and estimated inertia of vehicle.

In block 212, a control torque command may be determined for the attitude control actuators based on determined or estimated angular velocity. Similar to that previously described, a stabilization control law may be used for active nutation control about a given spin axis of the vehicle using reaction wheels or other momentum conserving actuators.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A system for controlling an aerospace vehicle using on-line inertia estimation, comprising:
   a processor on board the aerospace vehicle;
   an inertia estimator operable on the processor to generate an on-line inertia estimate of the aerospace vehicle using an estimated angular velocity of the aerospace vehicle and a measured or estimated momentum of a control actuator, wherein the inertia estimator generates the inertia estimate by defining a cost function derived from the estimated angular velocity and an estimated momentum of the aerospace vehicle, and wherein the cost function is driven to zero to cause the angular velocity estimate of the aerospace vehicle to converge to a true angular velocity of the aerospace vehicle; and
   a rate and attitude estimator operable on the processor to determine an angular position and the angular velocity of the aerospace vehicle using an attitude measurement of the aerospace vehicle and the on-line inertia estimate for controlling movement and orientation of the aerospace vehicle without measurement of any rates of rotation of the aerospace vehicle being required.

2. The system of claim 1, wherein the inertia estimator is adapted to generate the on-line inertia estimate of the aerospace vehicle without requiring information from an angular rate sensor.

3. The system of claim 1, wherein the inertia estimator operates in parallel with the rate and attitude estimator and wherein the on-line inertia estimate provides improved accuracy of the angular position and angular velocity of the aerospace vehicle to permit reduced aerospace vehicle power use and thermal loading for active nutation control.

4. The system of claim 1, wherein the inertia estimator generates the on-line inertia estimate by generating an on-line estimate of an inertia matrix about a center of mass of the aerospace vehicle using the estimated angular velocity of the aerospace vehicle and the measured or estimated momentum of the control actuator.

5. The system of claim 1, further comprising a feed-forward determination module operable on the processor to determine an estimated angular acceleration from a control torque command signal and a coupling between the angular velocity of the aerospace vehicle and a momentum of the aerospace vehicle.

6. The system of claim 5, wherein the coupling between the angular velocity of the aerospace vehicle and the momentum of the aerospace vehicle is determined based on the on-line inertia estimate from the inertia estimator.

7. The system of claim 5, wherein the rate and attitude estimator determines the angular position and the angular velocity by propagating equations of motion based on the estimated angular acceleration from the feed-forward determination module.

8. The system of claim 1, wherein a difference between a measured attitude of the aerospace vehicle and an estimated attitude of the aerospace vehicle is used to update the angular position and angular velocity estimates of the aerospace vehicle when attitude measurement data has been acquired by the aerospace vehicle.

9. The system of claim 8, further comprising an attitude sensor to measure an attitude of the aerospace vehicle.

10. The system of claim 1, further comprising an attitude control module to determine a torque command signal for operation of the control actuator for controlling of the aerospace vehicle and for determining a feed-forward angular acceleration as an input to the rate and attitude estimator.

11. The system of claim 10, wherein the attitude control module comprises a stabilization control law for active nutation control of a given spin axis of the aerospace vehicle using reaction wheels or other momentum conserving actuators.

12. An aerospace vehicle, comprising:
a plurality of actuators for controlling an attitude of the aerospace vehicle; and
a system for controlling the plurality of actuators using on-line inertia estimation, the system comprising:
an attitude sensor to measure an attitude of the aerospace vehicle;
a processor on board the aerospace vehicle;
an inertia estimator operable on the processor to generate an on-line inertia estimate of the aerospace vehicle using an estimated angular velocity of the aerospace vehicle and a measured or estimated momentum of the control actuator, wherein the inertia estimator generates the inertia estimate by defining a cost function derived from the estimated angular velocity and an estimated momentum of the aerospace vehicle, and wherein the cost function is driven to zero to cause the angular velocity estimate of the aerospace vehicle to converge to a true angular velocity of the aerospace vehicle; and
a rate and attitude estimator operable on the processor to determine an angular position and the angular velocity of the aerospace vehicle using the attitude measurement and the on-line inertia estimate for controlling movement and orientation of the aerospace vehicle.

13. The aerospace vehicle of claim 12, wherein the inertia estimator generates the on-line inertia estimate by generating an on-line estimate of an inertia matrix about a center of mass of the aerospace vehicle using the estimated angular velocity of the aerospace vehicle and the measured or estimated momentum of the control actuator.

14. The aerospace vehicle of claim 12, further comprising a feed-forward determination module operable on the processor to determine an estimated angular acceleration from a control torque command signal and a coupling between the angular velocity of the aerospace vehicle and a momentum of the aerospace vehicle, wherein the coupling between the angular velocity of the aerospace vehicle and the momentum of the aerospace vehicle is determined based on the on-line inertia estimate from the inertia estimator.

15. A method for controlling an aerospace vehicle using on-line inertia estimation, comprising:
measuring an attitude of the aerospace vehicle;
determining an on-line inertia estimate of the aerospace vehicle using an estimated angular velocity of the aerospace vehicle and a measured or estimated momentum of a control actuator, wherein determining the on-line inertia estimate comprises formulating a cost function derived from the estimated angular velocity of the aerospace vehicle and the estimated momentum of the aerospace vehicle, and wherein formulating the cost function comprises formulating the cost function with elements of the inertia matrix and driving the cost function to zero to cause the angular velocity estimate of the aerospace vehicle to converge to a true angular velocity of the aerospace vehicle;
determining an estimated angular position and the angular velocity of the aerospace vehicle using the attitude measurement and the on-line inertia estimate; and
controlling an attitude of the aerospace vehicle based on the estimated angular position and angular velocity of the aerospace vehicle.

16. The method of claim 15, wherein determining the on-line inertia estimate comprises determining or estimating a vehicle inertia matrix about a center of mass of the aerospace vehicle using the estimated angular velocity of the aerospace vehicle and the measured or estimated momentum of the control actuator.

17. The method of claim 15, further comprising determining an estimated angular acceleration from a control torque command signal and a coupling between the angular velocity of the aerospace vehicle and a momentum of the aerospace vehicle, wherein the coupling between the angular velocity of the aerospace vehicle and the momentum of the aerospace vehicle is determined based on the on-line inertia estimate from the inertia estimator.

18. A computer program product for controlling an aerospace vehicle using on-line inertia estimation, the computer program product comprising:
a non-transitory computer readable storage medium having computer readable program code embodied therewith, the computer readable program code comprising:
computer readable program code configured to determine an on-line inertia estimate of the aerospace vehicle using an estimated angular velocity of the aerospace vehicle and a measured or estimated momentum of a control actuator, wherein the computer readable program code configured to determine the on-line inertia estimate comprises computer readable program code configured to formulate a cost function derived from the estimated angular velocity of the aerospace vehicle and the estimated momentum of the aerospace vehicle, and wherein the cost function is driven to zero to cause the angular velocity estimate of the aerospace vehicle to converge to a true angular velocity of the aerospace vehicle;
computer readable program code configured to determine an estimated angular position and the angular velocity of the aerospace vehicle using an attitude measurement of the aerospace vehicle and the on-line inertia estimate; and
computer readable program code configured to control an attitude of the aerospace vehicle based on the estimated angular position and angular velocity of the aerospace vehicle.

* * * * *